(12) United States Patent
Urbach

(10) Patent No.: US 6,457,730 B1
(45) Date of Patent: Oct. 1, 2002

(54) ANTI-ROLL BAR WITH LINK ACTUATOR FOR CONTROLLING TORSIONAL RIGIDITY

(75) Inventor: Brian A. Urbach, Rochester Hills, MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/788,080

(22) Filed: Feb. 16, 2001

(51) Int. Cl.[7] .............................. B60G 7/00; B60P 7/00; B62D 7/00
(52) U.S. Cl. ...................... 280/124.161; 280/124.106; 280/124.107; 280/5.506
(58) Field of Search ................ 280/5.506, 124.106, 280/124.107, 124.152, 124.159, 124.16, 124.161; 188/282.4, 317

(56) References Cited

U.S. PATENT DOCUMENTS

| | | | | |
|---|---|---|---|---|
| 3,420,341 A | * | 1/1969 | Keehn | |
| 3,827,538 A | * | 8/1974 | Morgan | |
| 4,527,676 A | | 7/1985 | Emura et al. | |
| 4,724,937 A | * | 2/1988 | Fannin et al. | |
| 4,805,929 A | * | 2/1989 | Shibata et al. | |
| 5,161,822 A | | 11/1992 | Lund | |
| 5,217,245 A | * | 6/1993 | Guy | |
| 5,505,480 A | | 4/1996 | Pascarella | |
| 5,529,324 A | | 6/1996 | Krawczyk et al. | |
| 5,597,180 A | | 1/1997 | Ganzek | |
| 5,630,623 A | | 5/1997 | Ganzel | |
| 5,987,366 A | | 11/1999 | Jun | |
| 6,276,498 B1 | * | 8/2001 | Kirchner | 188/280 |
| 6,276,693 B1 | * | 8/2001 | Oakley et al. | 280/124.106 |
| 6,302,417 B1 | * | 10/2001 | Heyring | 267/187 |
| 6,318,523 B1 | * | 11/2001 | Moradmand et al. | 188/280 |
| 6,318,737 B1 | * | 11/2001 | Marechal et al. | 267/277 |
| 6,328,291 B1 | * | 12/2001 | Marzocchi et al. | 188/285 |
| 6,364,075 B1 | * | 4/2002 | Lemmens et al. | 188/282.1 |

* cited by examiner

Primary Examiner—Paul N. Dickson
Assistant Examiner—Joselynn Y. Sliteris
(74) Attorney, Agent, or Firm—Tarolli, Sundheim, Covell, Tummino & Szabo L.L.P.

(57) ABSTRACT

An apparatus (12) for use in a vehicle suspension (10) comprises an anti-roll bar (28) having opposite first and second end portions (30 and 32). An intermediate portion (34) is interposed between the first and second end portions (30 and 32) and is subjected to torsional forces when the first and second end portions (30 and 32) move relative to one another. The apparatus (12) further comprises an actuator (48) for attaching at least one of the first and second end portions (30 and 32) to a part of the vehicle suspension (10). The actuator (48) comprises a cylinder (52) for retaining fluid (54) and a piston assembly (56) for dividing the cylinder into two chambers (81 and 83). The piston assembly (56) is movable axially within the cylinder (52). The piston assembly (56) includes structure forming orifices (144) for interconnecting the two chambers (81 and 83) of the cylinder (52). A fluid flow area of the orifices (144) is adjustable to vary a resistance to relative movement of the first and second end portions (30 and 32) of the anti-roll bar (28).

13 Claims, 4 Drawing Sheets

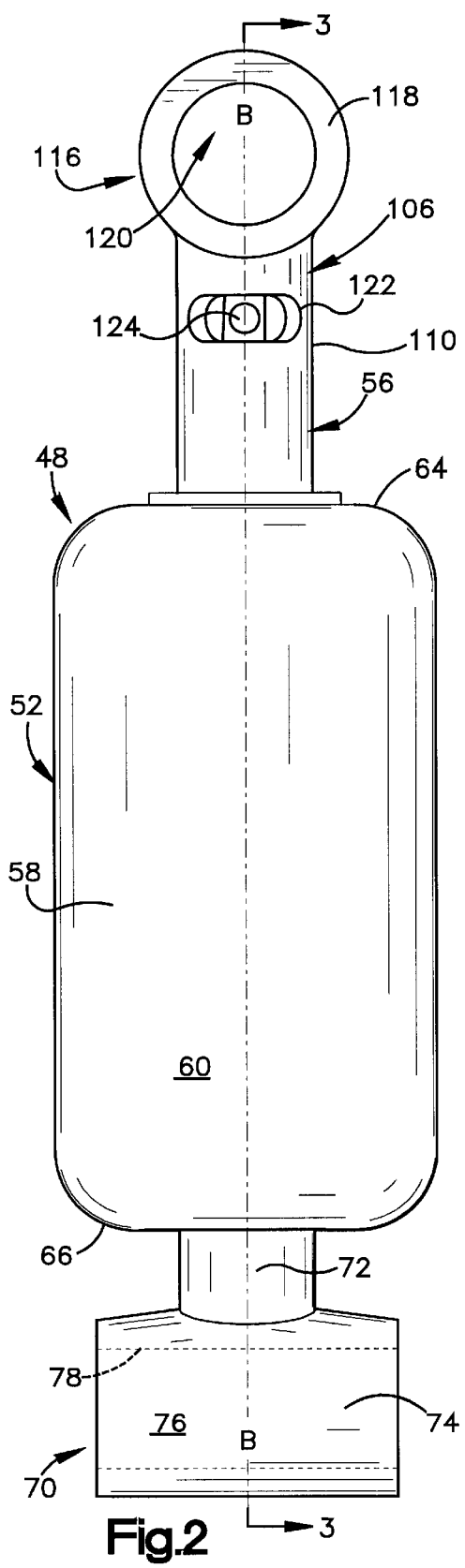
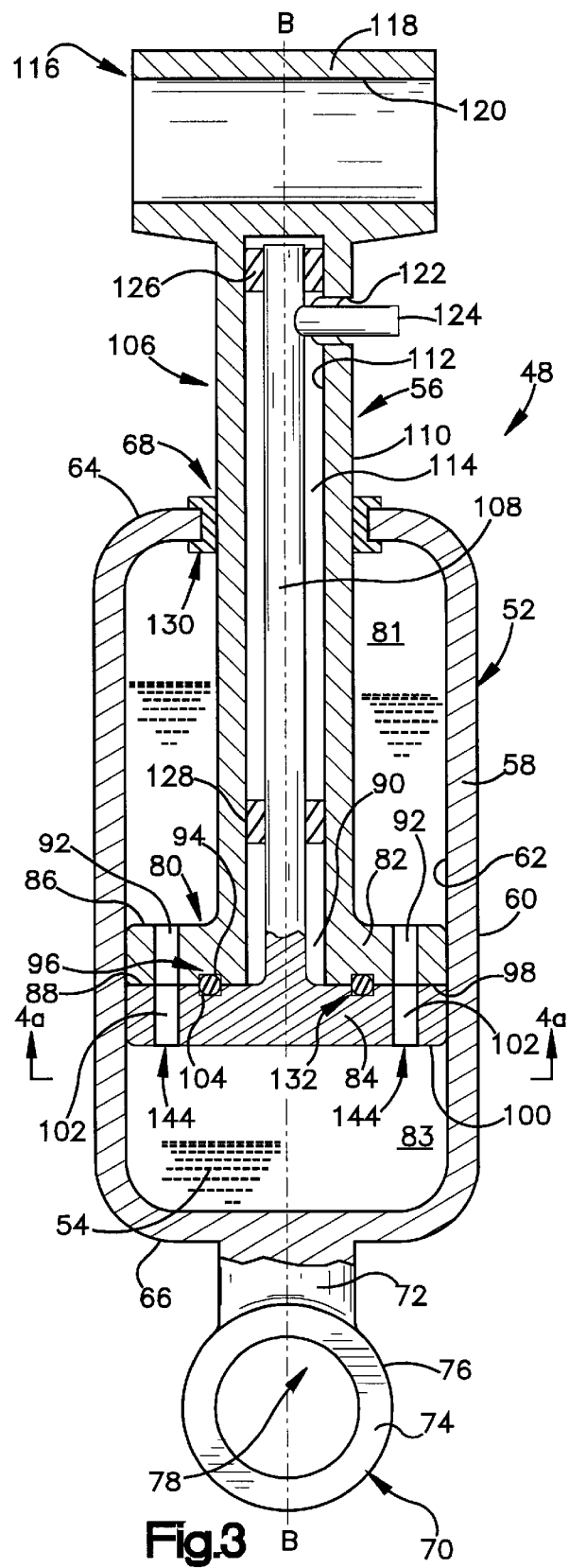

ANTI-ROLL BAR WITH LINK ACTUATOR FOR CONTROLLING TORSIONAL RIGIDITY

TECHNICAL FIELD

The present invention relates to an apparatus for use in a vehicle suspension and, more particularly, to an apparatus for use in helping to resist vehicle roll during a turn.

BACKGROUND OF THE INVENTION

Anti-roll bars, also known as sway bars, are used in vehicle suspensions for helping to resist vehicle roll during a turn. Anti-roll bars may be used in both the front and rear suspensions of a vehicle.

Anti-roll bars are generally U-shaped and include opposite first and second end portions and an intermediate portion. The first end portion is fixed to the right-hand side of the vehicle suspension and the second end portion is fixed to the left-hand side of the vehicle suspension. During a vehicle turn, the first end portion and the second end portion of the anti-roll bar move relative to one another. As a result, the intermediate portion of the anti-roll bar may be subjected to a torsional force. The torsional stiffness, i.e., the resistance to the torsional force, of the intermediate portion of the anti-roll bar helps to resist vehicle roll during the turn.

The stiffness of the anti-roll bar is also known to increase the spring rate of the vehicle suspension. The independence of the right-hand side and the left-hand side of the vehicle suspension may be affected by connecting the two sides with the anti-roll bar. Consequently, the vehicle ride may be affected, especially when the vehicle is traveling in a linear direction.

Known systems have attached at least one end portion of the anti-roll bar to the vehicle suspension with an actuator. The actuator includes a cylinder and a piston that is movable within the cylinder. The piston divides the cylinder into two variable volume chambers. The known systems further include a source of fluid and a control valve, both of which are independent of the actuator. The control valve is connected to each chamber of the piston by a hydraulic conduit. The control valve has three positions. In a first position, the control valve interconnects the hydraulic conduit connected to each chamber of the actuator, thereby allowing unrestricted movement of the piston in the cylinder. In a second position, the control valve sends hydraulic fluid to the first chamber and receives hydraulic fluid flowing out of the second chamber. In a third position, the control valve sends hydraulic fluid to the second chamber and receives hydraulic fluid flowing out of the first chamber. A system similar to that described above is disclosed in U.S. Pat. No. 5,529,324.

Although the known system helps to reduce the possible effects of the anti-roll bar on the spring rate of the vehicle, the known system includes many parts and installation of the known systems on a vehicle is complex.

SUMMARY OF THE INVENTION

This invention is an apparatus for use in a vehicle suspension. The apparatus comprises an anti-roll bar having opposite first and second end portions. An intermediate portion is interposed between the first and second end portions and is subjected to torsional forces when the first and second end portions move relative to one another. The apparatus further comprises an actuator for attaching at least one of the first and second end portions to a part of the vehicle suspension. The actuator comprises a cylinder for retaining fluid and a piston assembly for dividing the cylinder into two chambers. The piston assembly is movable within the cylinder. The piston assembly includes structure forming orifices for interconnecting the two chambers of the cylinder. A fluid flow area of the orifices is adjustable to vary a resistance to relative movement of the first and second end portions of the anti-roll bar.

BRIEF DESCRIPTION OF THE DRAWINGS

The foregoing and other features of the present invention will become apparent to those skilled in the art to which the present invention relates upon reading the following description with reference to the accompanying drawings, in which:

FIG. 2 is a schematic view of an actuator of the apparatus of the present invention;

FIG. 3 is a view taken along line 3—3 in FIG. 2;

DETAILED DESCRIPTION OF THE INVENTION

Figure 1:
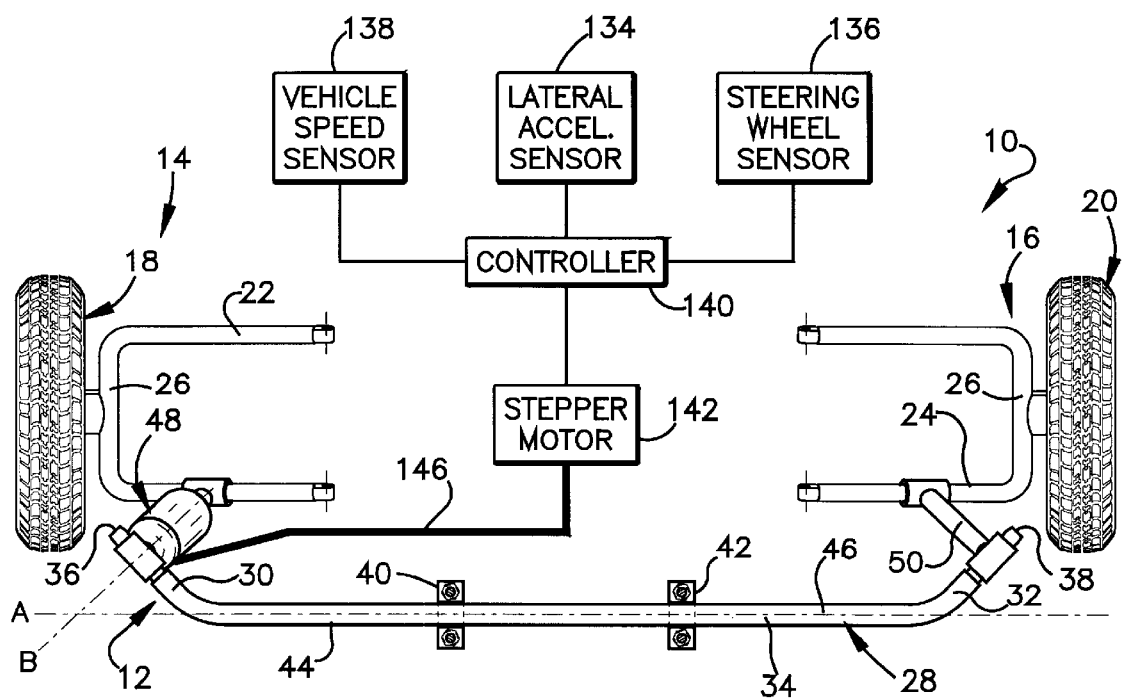
FIG. 1 is a schematic view of a portion of a vehicle suspension including an apparatus constructed in accordance with the present invention.

FIG. 1 schematically illustrates a portion of a vehicle suspension 10 including an apparatus 12 of the present invention.

The suspension 10 includes a left-hand side 14 and a right-hand side 16. A first steerable wheel 18 is connected to the left-hand side 14 of the suspension 10 and a second steerable wheel 20 is connected to the right-hand side 16 of the suspension 10.

The left-hand side 14 of the suspension 10 includes a first control arm 22 and the right-hand side 16 of the suspension 10 includes a second control arm 24. Both the first and second control arms 22 and 24 are U-shaped. Steerable wheel 18 connects with a closed portion 26 of the U-shape of control arm 22. Steerable wheel 20 connects with a closed portion 27 of the U-shape of control arm 24.

The apparatus 12 of the present invention includes an anti-roll bar 28. The anti-roll bar 28 includes opposite first and second end portions 30 and 32, respectively. An intermediate portion 34 is interposed between the respective end portions 30 and 32. The anti-roll bar 28 has a generally U-shaped configuration with the first and second end portions 30 and 32 forming two legs of the U-shape and the intermediate portion 34 forming a closed end of the U-shape.

The intermediate portion 34 of the anti-roll bar 28 extends linearly. In the illustrated embodiment, the intermediate portion 34 has a length that is approximately eighty percent of the total length of the anti-roll bar 28. The total length of the anti-roll bar 28 is the length from a terminal end 36 of the first end portion 30 to a terminal end 38 of the second end portion 32.

Two brackets 40 and 42 support the intermediate portion 34 of the anti-roll bar 28. The brackets 40 and 42 attach to the vehicle frame (not shown) in a known manner and allow the intermediate portion 34 of the anti-roll bar 28 to freely rotate about an axis A passing through the center of the intermediate portion 34 of the anti-roll bar 28.

The first end portion 30 of the anti-roll bar 28 extends from the left-hand end 44 of the intermediate portion 34 of the anti-roll bar 28. In the illustrated embodiment, the first end portion 30 extends from the intermediate portion 34 at an angle of approximately forty-five degrees relative to axis A and has a length that is approximately one-tenth of the total length of the anti-roll bar 28. The first end portion 30 terminates at terminal end 36.

The second end portion 32 of the anti-roll bar 28 is a mirror image of the first end portion 30. The second end portion 32 extends from a right-hand end 46 of the intermediate portion 34 of the anti-roll bar 28. In the illustrated embodiment, the second end portion 32 extends from the intermediate portion 34 at an angle of approximately forty-five degrees relative to axis A and has a length that is approximately one-tenth of the total length of the anti-roll bar 28. When no torsional forces are applied to the anti-roll bar 28, the second end portion 32 is within the same plane as the first end portion 30. The second end portion 32 terminates at terminal end 38.

As shown in FIG. 1, the apparatus 12 further includes an actuator 48. The actuator 48 attaches the first end portion 30 of the anti-roll bar 28 to the first control arm 22 of the vehicle suspension 10. A detailed description of the actuator 48 is found below.

A link member 50 attaches the second end portion 32 of the anti-roll bar 28 to the second control arm 24 of the vehicle suspension 10. The link member 50 is a solid steel rod that extends between the second control arm 24 and the second end portion 32 of the anti-roll bar 28.

FIGS. 2 and 3 illustrate the actuator 48 of the apparatus 12 of the present invention. The actuator 48 includes a cylinder 52 for retaining a fluid 54 and a piston assembly 56. Description of the actuator 48 will be made with reference to axis B. As shown in FIG. 1, axis A represents a generally horizontal axis; whereas, axis B represents a generally vertical axis.

The cylinder 52 includes an axially extending, cylindrical main body portion 58. The cylindrical main body portion 58 is centered on axis B. The main body portion 58 of the cylinder 52 includes an outer wall 60 and an inner wall 62.

First and second axial ends 64 and 66 close axially opposite ends of the main body portion 58 of the cylinder 52. The first axial end 64 of the cylinder 52 is annular and includes an opening 68 that is centered on axis B. As illustrated in FIG. 3, the opening 68 has a diameter of approximately fifty percent of the inner diameter of the main body portion 58 of the cylinder 52. The second axial end 66 of the cylinder 52 is domed and completely closes the cylinder 52.

A first mounting member 70 for attaching the cylinder 52 to the first control arm 22 extends from the center of the second axial end 66 of the cylinder 52 in a direction axially opposite the main body portion 58 of the cylinder 52.

The first mounting member 70 illustrated in FIGS. 2 and 3 includes a cylindrical rod 72 and a first tubular bushing 74. The cylindrical rod 72 is centered on axis B. One end of the cylindrical rod 72 is fixed to the second axial end 66 of the cylinder 52 and the other end of the cylindrical rod 72 is fixed to an outer surface 76 (FIG. 3) of the first tubular bushing 74. The first tubular bushing 74 includes a channel 78 that extends in a direction perpendicular to axis B. As shown in FIG. 1, a part of the first control arm 22 extends through the channel 78 of tubular bushing 74. A fastener (not shown) fixes the first tubular bushing 74 to the first control arm 22.

The piston assembly 56 of the actuator 48 includes a piston 80 (FIG. 3) formed by first and second plates 82 and 84, respectively. The piston 80 is enclosed within the cylinder 52 and is movable within the cylinder 52 along axis B. The piston 80 divides the cylinder 52 into two variable volume chambers 81 and 83.

The first plate 82 forming the piston 80 is flat and circular. The first plate 82 is centered on axis B and extends radially outwardly to engage the inner wall 62 of the main body portion 58 of the cylinder 52. The first plate 82 has an upper surface 86 and a lower surface 88. The upper surface 86 of the first plate 82 is nearest the first axial end 64 of the cylinder 52 and the lower surface 88 is nearest the second axial end 66 of the cylinder 52. An annular ring (not shown) may extend circumferentially around the first plate 82 for sealing the first plate 82 against the inner wall 62 of the cylinder 52.

An opening 90 extends axially through the first plate 82. The opening 90 is centered on axis B and in the illustrated embodiment has a diameter of approximately twenty-five percent of the diameter of the first plate 82. Those skilled in the art will recognize that the size of the opening 90 may be varied.

The first plate 82 of the piston 80 further includes a plurality of axially extending passages 92. The axially extending passages 92 are arranged in a circular array about axis B. Preferably, the first plate 82 has six axially extending passages 92, two of which are shown in FIG. 3.

An annular groove 94 extends into the lower surface 88 of the first plate 82 in an area between the central opening 90 and the axially extending passages 92. The annular groove 94 completely surrounds the central opening 90. Preferably, the annular groove 94 has a rectangular cross-sectional profile for receiving a portion of an o-ring 96.

The second plate 84 forming the piston 80 is also flat and circular. The second plate 84 is centered on axis B. As illustrated in FIG. 3, the second plate 84 also extends radially outwardly to engage the inner wall 62 of the main body portion 58 of the cylinder 52. Those skilled in the art will recognize that the second plate 84 may have a diameter that differs from the diameter of the first plate 82.

The second plate 84 has an upper surface 98 and a lower surface 100. The upper surface 98 of the second plate 84 engages the lower surface 88 of the first plate 82. The lower surface.100 of the second plate 84 is nearest the second axial end 66 of the cylinder 52.

Figure 4A:
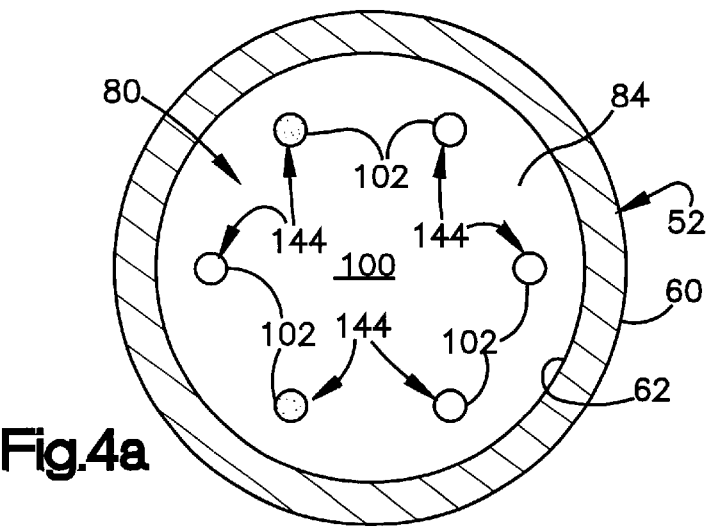
FIGS. 4(a)–4(c) are schematic views of a portion of the actuator of FIG. 3 illustrating a change in the flow area of orifices in the actuator.
Figure 4B:
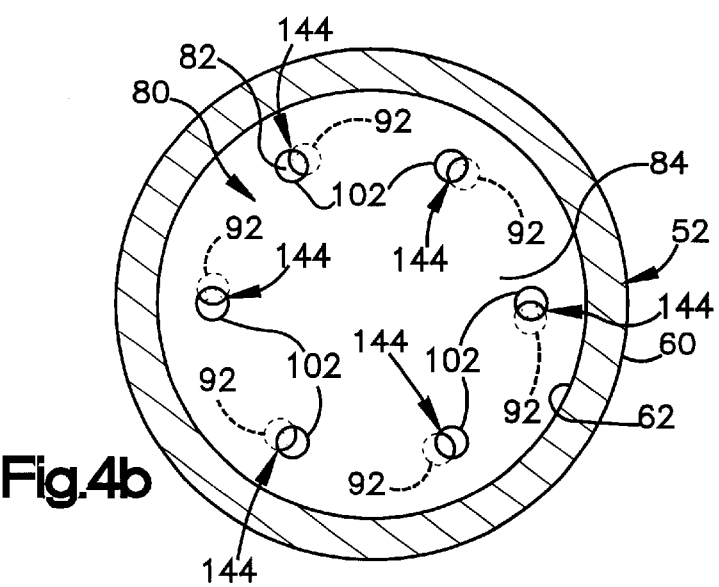
Figure 4C:
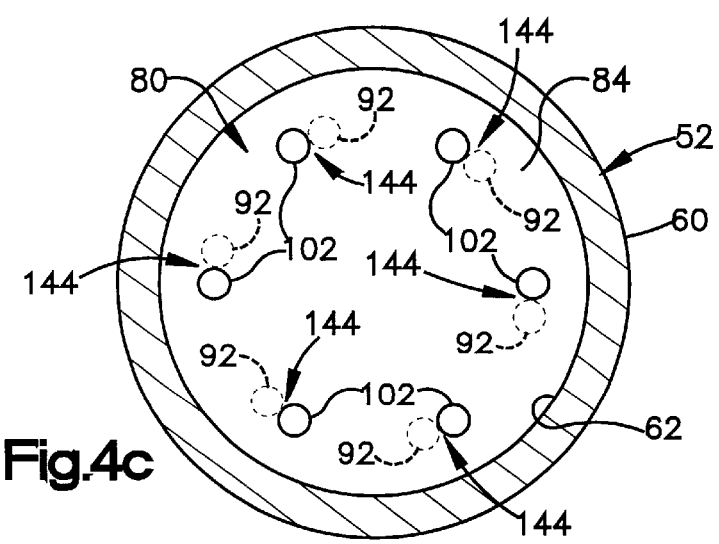

The second plate 84 of the piston 80 also includes a plurality of axially extending passages 102 arranged in a circular array about axis B. Preferably, the second plate has six axially extending passages 102, as shown in FIGS. 4(a)–(c). The axially extending passages 102 of the second plate 84 may be aligned, depending upon rotation of the second plate 84 relative to the first plate 82, with the axially extending passages 92 of the first plate 82 of the piston 80.

An annular groove 104 extends into the upper surface 98 of the second plate 84 in an area corresponding to the annular groove 94 in the first plate 82. Preferably, the annular groove 104 in the second plate 84 has a rectangular cross-sectional profile for receiving a portion of o-ring 96.

The piston assembly 56 further includes first and second piston rods 106 and 108, respectively. The first piston rod 106 attaches to the upper surface 86 of the first plate 82 of the piston 80. Preferably, the first piston rod 106 is welded to the first plate 82. The first piston rod 106 is movable axially with the piston 80.

The first piston rod 106 is tubular and includes an outer surface 110 and an inner surface 112. The outer surface 110 has a diameter that is slightly smaller than the diameter of the opening 68 on the first axial end 64 of the cylinder 52. The inner surface 112 defines a channel 114 that extends axially through the first piston rod 106. The channel 114 is coaxial with and aligns with the opening 90 extending through the first plate 82 of the piston 80.

A second mounting member 116 is partially formed from an end of the first piston rod 106 opposite the piston 80. The second mounting member 116 further includes a second tubular bushing 118. The second tubular bushing 118 includes a channel 120 that extends perpendicular to both axis B and the channel 78 of the first tubular bushing 74. As shown in FIG. 1, the first end portion 30 of the anti-roll bar 28 extends through the channel 120 of the second tubular bushing 118. A fastener (not shown) fixes the second tubular bushing 118 to the first end portion 30 of the anti-roll bar 28.

A slot 122 extends through the first piston rod 106 in an area near the seconding mounting member 116. The slot 122 extends circumferentially about axis B around a portion of the first piston rod 106.

The second piston rod 108 is coaxial with the first piston rod 106 and extends through the channel 114 of the first piston rod 106. The second piston rod 108 is fixed for axial movement with the first piston rod 106. One end of the second piston rod 108 attaches to the upper surface 98 of the second plate 84 of the piston 80. An opposite end of the second piston rod 108 terminates near the second mounting member 116. The second piston rod 108 is spaced radially inwardly from the inner surface 112 of the first piston rod 106.

A radially extending arm 124 is connected to the second piston rod 108. The radially extending arm 124 extends through the slot 122 in the first piston rod 106. The radially extending arm 124 is secured to the second piston rod 108 such that movement of the arm 124 in the slot 122 causes rotation of the second piston rod 108 and consequently, rotation of the second plate 84 of the piston 80.

Two bearings 126 and 128 rotatably attach the second piston rod 108 to the first piston rod 106. An outer race of each bearing 126 and 128 is secured to the inner surface 112 of the first piston rod 106. An inner race of each bearing 126 and 128 attaches to the second piston rod 108. As a result, the second piston rod 108 is rotatable relative to the first piston rod 106. The axis of rotation for the second piston rod 108 is axis B. As those skilled in the art will recognize, rotation of the second piston rod 108 relative to the first piston rod 106 causes rotation of the second plate 84 of the piston 80 relative to the first plate 82 of the piston 80.

The actuator 48 also includes at least two seals 130 and 132. A first seal 130 is secured in the opening 68 in the first axial end 64 of the cylinder 52. The first seal 130 engages the outer surface 110 of the first piston rod 106 and prevents fluid 54 leakage from the cylinder 52 as the piston assembly 56 moves axially through the opening 68 in the first axial end 64 of the cylinder 52.

A second seal 132 is interposed between the first and second plates 82 and 84 of the piston 80 for preventing fluid 54 leakage between the first and second plates 82 and 84 and into the channel 114 of the first piston rod 106. A portion of the second seal 132 seats in the annular groove 94 on the lower surface 88 of the first plate 82 and another portion seats in the annular groove 104 on the upper surface 98 of the second plate 84. Preferably, the second seal 132 is an o-ring 96 that allows the second plate 84 to rotate relative to the first plate 82.

As shown in FIG. 1, the apparatus 12 further includes a plurality of sensors 134, 136, and 138 and a controller 140.

Preferably, the plurality of sensors 134, 136, and 138 includes a lateral acceleration sensor 134, a steering wheel rotation sensor 136, and a vehicle speed sensor 138. Each sensor 134, 136, and 138 is electrically connected to the controller 140.

The lateral acceleration sensor 134 continuously senses the lateral acceleration of the vehicle and generates an electrical signal indicative of the sensed lateral acceleration. The steering wheel rotation sensor 136 continuously senses the magnitude and rate of rotation of the vehicle steering wheel and generates an electrical signal indicative of these parameters. The vehicle speed sensor 138 continuously senses the vehicle speed and generates an electrical signal indicative of the speed.

Preferably, the controller 140 includes a microprocessor. The controller 140 receives the signals generated by the lateral acceleration sensor 134, the steering wheel rotation sensor 136, and the vehicle speed sensor 138. The controller 140 analyzes the respective signals and generates a control signal for controlling the torsional stiffness of the anti-roll bar 28. The controller 140 sends the control signal to an electric motor used for actuating the actuator 48.

Preferably, the electric motor is a stepper motor 142. Linkage, shown schematically at 146, connects the stepper motor 142 to the arm 124 extending radially from the second piston rod 108. Those skilled in the art will recognize that the stepper motor 142 may be connected to the second piston rod 108 in another manner, such as through a gear assembly. Upon receiving the control signal from the controller 140, the stepper motor 142 causes the arm 124 extending radially from second piston rod 108 to move through the slot 122 in the first piston rod 106. Movement of the arm 124 causes rotation of the second piston rod 108, and consequently, rotation of the second plate 84 of the piston 80 relative to the first plate 82 of the piston 80.

Rotation of the second plate 84 of the piston 80 relative to the first plate 82 of the piston 80 adjusts the flow area of orifices 144 (FIG. 3) formed in the piston 80 by alignment of the axially extending passages 92 of the first plate 82 and axially extending passages 102 of the second plate 84 of the piston 80. FIGS. 4(a)–4(c) illustrate the adjustment of the flow area of the orifices 144. FIG. 4(a) illustrates the orifices 144 of the piston 80 when the axially extending passages 92 of the first plate 82 are completely aligned with the axially extending passages 102 of the second plate 84. As shown, the flow area of each orifice 144 is equal to the flow area of the axially extending passages 102 in the second plate 84. FIG. 4(b) shows the axially extending passages 92 of the first plate 82 partially aligned with the axially extending passages 102 of the second plate 84. The flow area of the orifices 144 in FIG. 4(b) is less than the flow area shown in FIG. 4(a) by the area of the first plate 82 that covers the axially extending passages 102 in the second plate 84. FIG. 4(c) shows no alignment between the axially extending passages 92 of the first plate 82 and the axially extending passages 102 of the second plate 84. As a result, the orifices 144 of the piston 80 shown in FIG. 4(c) have no flow area.

Since the actuator 48 is an isolated system having no fluid 54 flow into or out of the cylinder 52, the resistance to movement of the piston 80 within the cylinder 52 is inversely proportional to the flow area of the orifices 144. Thus, if the orifices 144 are fully open, as shown in FIG. 4(a), the resistance to movement of the piston 80 will be minimized and a force along axis B will cause the piston 80 to move within cylinder 52. During movement of the piston 80, fluid 54 will flow through the orifices 144 and the volume of one chamber, for example chamber 81, will increase, while the volume of the other chamber 83 will decrease. However, if the orifices 144 are completely closed, as shown in FIG. 4(c), the resistance to movement of the piston 80 will be maximized and no fluid 54 may flow between the chambers 81 and 83 of the cylinder 52. As a result, the piston 80 will be locked in place within the cylinder 52 as the fluid 54 will resist axial movement of the piston 80.

When the apparatus 12 is mounted on a vehicle, the actuator 48 affects the torsional resistance of the anti-roll bar 28. Since the first end portion 30 of the anti-roll bar 28 is attached to a part of the vehicle suspension 10 by the actuator 48, the movement of the piston 80 in the cylinder 52 of the actuator 48 affects the movement of the first end portion 30 of the anti-roll bar 28. When the orifices 144 of the piston 80 are fully opened, the piston 80 will move easily within the cylinder 52 and the first end portion 30 of the anti-roll bar 28 will move easily with respect to the second end portion 32 of the anti-roll bar 28. As a result, the anti-roll bar 28 will have virtually no resistance to roll of the vehicle. This is most likely to occur when the vehicle is traveling in a straight line. When the orifices 144 of the piston 80 of the actuator 48 are completely closed, the piston 80 will not move within the cylinder 52 of the actuator 48 and the resistance to movement of the first end portion 30 of the anti-roll bar 28 relative to the second end portion 32 of the anti-roll bar 28 is maximized. As a result, the torsional stiffness of the anti-roll bar 28 is increased and the anti-roll bar 28 will resist roll of the vehicle. This is most likely to occur when a turn is sensed. Depending upon the parameters sensed by the plurality of sensors 134, 136, and 138, the flow area of the orifices 144 may be adjusted to vary the torsional resistance of the anti-roll bar 28.

When the orifices 144 of the piston 80 are fully open, the left-hand side 14 and the right-hand side 16 of the vehicle suspension 10 may move independently of one another with little affect from the anti-roll bar 28. However, when the orifices 144 on the piston 80 are closed, the anti-roll bar 28 will rigidly connect the left-hand and right-hand sides 14 and 16 of the vehicle suspension 10 and help to resist roll of the vehicle during a turn.

Figure 5:
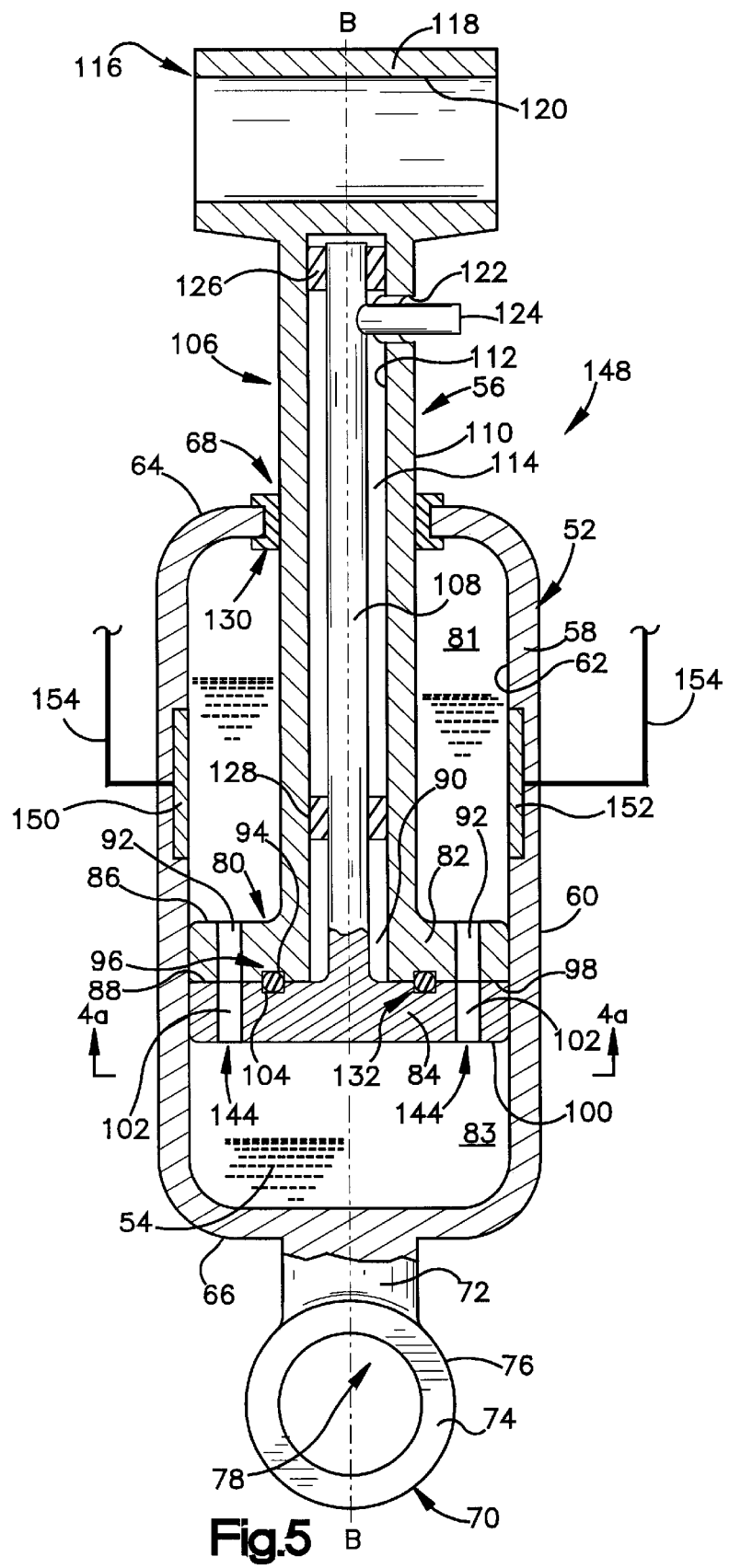
FIG. 5 illustrates a second embodiment of an actuator of the apparatus of the present invention.

A second embodiment of the actuator 148 of the apparatus 10 of the present invention is illustrated in FIG. 5. In FIG. 5, first and second electrodes 150 and 152 are attached to the inner wall 60 of the cylinder 52 of the actuator 148. Leads 154 electrically connect the electrodes 150 and 152 to the controller 140. In addition to the functions previously described, the controller 140 is operable to provide a variable electrical field, in the form of voltage, to the electrodes 150 and 152 in response to the signals received from the plurality of sensors 134, 136, and 138. The fluid 54 within the cylinder 52 is an electrorheological fluid. By varying the voltage potential between the first and second electrodes 150 and 152, the viscosity of the fluid 54 can be changed. By changing the viscosity of the fluid 54, the fluid 54 flow through the orifices 144 is changed and resistance to movement of the piston 80 in the cylinder 52 is changed. As a result, the torsional stiffness of the anti-roll bar 28 can be further adjusted by controlling the viscosity of the fluid 54.

From the above description of the invention, those skilled in the art will perceive improvements, changes and modifications. For example, in place of or in addition to the actuator 48 described above, an actuator 48 may be used to connect the second end portion 32 of the anti-roll bar 28 to the vehicle suspension 10. Those skilled in the art will also recognize that the first mounting member 70 may attach to the anti-roll bar 28 and the second mounting member 116 to a part of the vehicle suspension 10. Such improvements, changes and modifications within the skill of the art are intended to be covered by the appended claims.

Having described the invention, the following is claimed:

1. An apparatus for use in a vehicle suspension, the apparatus comprising:

an anti-roll bar having opposite first and second end portions, an intermediate portion interposed between the first and second end portions and being subjected to torsional forces when the first and second end portions move relative to one another; and an actuator for attaching at least one of the first and second end portions to a part of the vehicle suspension;

the actuator comprising a cylinder for retaining fluid and a piston assembly for dividing the cylinder into two chambers, the piston assembly being movable axially within the cylinder, the piston assembly including structure forming orifices for interconnecting the two chambers of the cylinder, a fluid flow area of the orifices being adjustable to vary a resistance to relative movement of the first and second end portions of the anti-roll bar.

2. The apparatus of claim 1 further being defined by:

the structure of the piston assembly forming orifices includes a piston having a first plate for engaging an inner wall of the cylinder and a second plate engaging the first plate, the second plate being rotatable relative to the first plate, both the first and second plates having a plurality of axially extending passages, the axially extending passages of the first and second plates, collectively, forming the orifices.

3. The apparatus of claim 2 further being defined by:

the fluid flow area of the orifices being adjustable by rotation of the second plate relative to the first plate.

4. The apparatus of claim 1 further being defined by:

the cylinder being an isolated system having no fluid flow into or out of the cylinder.

5. The apparatus of claim 3 further being defined by:

the cylinder including a first axial end and a second axial end, the first axial end including an opening, and a first piston rod attaching to the first plate of the piston and extending through the opening in the first axial end of the cylinder, the first piston rod moving axially through the opening as the piston assembly moves axially within the cylinder.

6. The apparatus of claim 5 further being defined by:

a first seal being located in the opening in the first axial end of the cylinder, the first seal preventing fluid leakage from the cylinder as the first piston rod moves axially through the opening in the first axial end of the cylinder.

7. The apparatus of claim 5 further being defined by:

the first plate of the piston having a central opening;

the first piston rod being tubular and having a central, axially extending channel;

the channel of the first piston rod aligning with the opening of the first plate of the piston; and a second piston rod extending through the channel of the first piston rod for attaching to the second plate of the piston.

8. The apparatus of claim 7 further being defined by:

a stepper motor being connected with the second piston rod, the stepper motor rotating the second piston rod relative to the first piston rod;

rotation of the second piston rod relative to the first piston rod causing rotation of the second plate of the piston relative to the first plate of the piston.

9. The apparatus of claim 8 further including:

at least one sensor for sensing a vehicle driving condition and generating a signal indicative of the driving condition; and a controller for receiving the sensor signal and controlling the stepper motor in response to the sensor signal.

10. The apparatus of claim 7 further being defined by:

a second seal being interposed between the first plate of the piston and the second plate of the piston;

the second seal surrounding the opening in the first plate of the piston and preventing fluid leakage between the first and second plates of the piston and into the first piston rod.

11. The apparatus of claim 1 further being defined by:

a first one of the piston assembly and the cylinder being attached to a respective end portion of the anti-roll bar; and a second one of the piston assembly and the cylinder being attached to a part of the vehicle suspension.

12. An apparatus for use in a vehicle suspension, the apparatus comprising:

an anti-roll bar having opposite first and second end portions, an intermediate portion interposed between the first and second end portions and being subjected to torsional forces when the first and second end portions move relative to one another; and an actuator for attaching at least one of the first and second end portions to a part of the vehicle suspension;

the actuator comprising a cylinder for retaining fluid and a piston assembly for dividing the cylinder into two chambers, the piston assembly being movable axially within the cylinder, the piston assembly including structure forming orifices for interconnecting the two chambers of the cylinder, a fluid flow area of the orifices being adjustable to vary a resistance to relative movement of the first and second end portions of the anti-roll bar, the fluid comprising an electrorheological fluid having an electrically variable viscosity.

13. An apparatus for use in a suspension of a vehicle, the apparatus comprising:

an anti-roll bar having opposite first and second end portions, an intermediate portion interposed between the first and second end portions and being subjected to torsional forces when the first and second end portions move relative to one another;

an actuator for controlling torsional stiffness of the anti-roll bar, the actuator attaching at least one of the first and second end portions to a part of the vehicle suspension; and a lateral acceleration sensor for continuously sensing lateral acceleration of the vehicle, a signal from the lateral acceleration sensor controlling the actuator, the actuator comprising a cylinder for retaining fluid and a piston assembly for dividing the cylinder into two chambers, the piston assembly being movable axially within the cylinder, the piston assembly including structure forming orifices for interconnecting the two chambers of the cylinder, a fluid flow area of the orifices being adjustable to vary a resistance to relative movement of the first and second end portions of the anti-roll bar.

* * * * *